United States Patent
Wickes et al.

(10) Patent No.: US 8,581,876 B1
(45) Date of Patent: Nov. 12, 2013

(54) STAND ALONE ACTIVE STORAGE UNIT FOR MEMORY DEVICES

(71) Applicants: Dutch Eugene Wickes, Dallas, TX (US); Cheryl Dalton Wilson, Dallas, TX (US)

(72) Inventors: Dutch Eugene Wickes, Dallas, TX (US); Cheryl Dalton Wilson, Dallas, TX (US)

( * ) Notice: Subject to any disclaimer, the term of this patent is extended or adjusted under 35 U.S.C. 154(b) by 0 days.

(21) Appl. No.: 13/911,642

(22) Filed: Jun. 6, 2013

Related U.S. Application Data

(60) Provisional application No. 61/665,662, filed on Jun. 28, 2012.

(51) Int. Cl.
*G06F 3/041* (2006.01)

(52) U.S. Cl.
USPC ............... 345/173; 361/679.31; 715/864

(58) Field of Classification Search
USPC ............... 345/173; 711/103, 115, 100;
361/679.31, 679.4, 679.32, 679.33;
206/307; 211/41.12; 248/346.03;
710/13; 715/864
See application file for complete search history.

(56) References Cited

U.S. PATENT DOCUMENTS

| | | | |
|---|---|---|---|
| 6,983,341 B1 | 1/2006 | Lim et al. | |
| 8,050,713 B2 | 11/2011 | Ransom et al. | |
| 8,351,195 B2 * | 1/2013 | Huang | 361/679.31 |
| 2001/0017989 A1 * | 8/2001 | Tamai et al. | 399/16 |
| 2004/0054863 A1 * | 3/2004 | Harada et al. | 711/164 |
| 2005/0270063 A1 * | 12/2005 | Cornett | 326/39 |
| 2005/0286225 A1 * | 12/2005 | Moore et al. | 361/695 |
| 2006/0069840 A1 * | 3/2006 | Corbett et al. | 710/313 |
| 2008/0155165 A1 | 6/2008 | Mei et al. | |
| 2008/0173598 A1 * | 7/2008 | Fiorentino | 211/41.12 |
| 2008/0261450 A1 * | 10/2008 | Nguyen et al. | 439/607 |
| 2009/0179536 A1 * | 7/2009 | Moore | 312/223.2 |
| 2010/0199023 A1 * | 8/2010 | Lee | 711/103 |
| 2011/0084845 A1 * | 4/2011 | Krug et al. | 340/636.1 |
| 2011/0087825 A1 | 4/2011 | Cialini et al. | |
| 2011/0161688 A1 * | 6/2011 | Nonomura et al. | 713/300 |
| 2012/0159047 A1 * | 6/2012 | Li et al. | 711/103 |
| 2012/0206874 A1 * | 8/2012 | Huang | 361/679.31 |
| 2013/0075566 A1 * | 3/2013 | Grant | 248/346.03 |
| 2013/0113727 A1 * | 5/2013 | Lin et al. | 345/173 |
| 2013/0166937 A1 * | 6/2013 | Tu et al. | 713/340 |

FOREIGN PATENT DOCUMENTS

DE     20200468 U1     10/2002

OTHER PUBLICATIONS

HP, User Manual for HP TouchSmart IQ500 desktop PC, 2008.*
B&H Photo and Electronics Corp., "The Professional's Souce (TM) for Photo, Video & Pro Audio," product catalog, Summer, 2012, 3 pages, New York, NY.

(Continued)

*Primary Examiner* — Koosha Sharifi-Tafreshi
(74) *Attorney, Agent, or Firm* — Whitaker Chalk Swindle & Schwartz PLLC; Stephen S. Mosher

(57) ABSTRACT

An active, portable, stand alone memory device storage unit, comprising a housing containing a plurality of memory device receptacles, a touch sensitive display screen, and a programmed processor circuit coupled to the plurality of receptacles and the touch sensitive display. The unit provides access to each memory device installed in a receptacle to determine its identity, contents, capacity occupied, etc. and enables viewing the data stored on a memory device or transferring portions of the data from one device memory device to another, either inside or outside the storage unit, all without connecting the storage unit to a computer.

23 Claims, 11 Drawing Sheets

(56) References Cited

OTHER PUBLICATIONS

Wikipedia, "Digital Photo Frame," Jun. 6, 2012, webpage, 2 pages, http://en.wikipedia.org.

Digiframes, product webpage, Jun. 6, 2012, 1 page, www.digiframes.com.

Mr. E. Tech., "i-FlashDrive USB Transfers Files to Apple Devices Without ITunes," webpage blog, Jun. 8, 2012, 1 page, http:/blog.allusb.com.

freshiNFOS, "Sanwa USB Reader lets you Jack a Mouse Into Android Devices," Jun. 13, 2012, 7 pages, http:/freshinfos.com.

Computer geeks.com, "3-Port USB 2.0 Hub & Charger for iPhone 3gS/iPod (Black)," product webpage, Jun. 13, 2012, 3 pages, www.geeks.com.

SIMCO Electronic Gifts Co., Ltd., "Product Name 4-Port USB Hub With Flashing Digital Photo Frame," product webpage, Jun. 13, 2012, 2 pages, www.cccme.org.cn.

\* cited by examiner

STAND ALONE ACTIVE STORAGE UNIT FOR MEMORY DEVICES

CROSS REFERENCE TO RELATED APPLICATIONS

This application claims priority to U.S. Provisional Patent Application Ser. No. 61/665,662 filed Jun. 28, 2012 and entitled STAND ALONE STORAGE UNIT FOR MEMORY DEVICES.

BACKGROUND OF THE INVENTION

1. Field of the Invention

The present invention generally relates to computing devices and more particularly to stand alone apparatus for storing a plurality of portable memory devices and capable of displaying identification and content information about the stored elements.

2. Background of the Invention and Description of the Prior Art

Storage of objects containing information is well known in the art. Libraries provide for storing books and other kinds of objects that contain information. The libraries include catalogs of the books stored on its shelves for users to determine what objects are stored there along with information about the contents in each object listed in the catalog.

The advent of personal computers and the availability of external plug-in devices containing memory readable by the computer led to the need for ways to store the external memory devices when not in use. Memory devices in the form of magnetic tape, or magnetic or optical discs, and more recently, miniature memory drives and semiconductor memory devices such as thumb drives and the like can typically can benefit from some form of organized storage so that a particular memory element or device can be conveniently carried by a user and inserted into the computer to access its contents. However, users of portable memory elements often encounter a tedious task to find a particular unlabeled element or to determine quickly the contents of a particular element, when the computer has one or two USB ports, for example. Even if an adapter having several USB ports is available the task is not made easier. The difficulty remains as to how to determine the contents of the memory.

Heretofore such memory elements or devices must be inserted into the computer or an accessory adapter or drive unit to determine the identity and contents of the memory and to access that contents. This is an inconvenience when many such memory elements are accumulated, especially because the memory elements themselves often contain no external indicia of its identity or contents. Examples of these conventional adapters include an adapter to connect a USB flash drive to an input port on the computing device such as a PC or tablet or mobile telephone device. Some adapters include the ability to connect several such flash drives to a computing device to access the flash drive. Adapters of this kind are not well-suited to storage of the flash drives and must be connected to a computer to determine the identity and content of the flash drive. Providing a USB port receptacle in a computing device is also not well suited to storing an accumulation of flash drives or like memory elements and providing readouts of any of the plurality of flash drive units a user may have accumulated except to insert each flash drive into the receptacle one-by-one. So-called "USB hubs" provide receptacles for connecting several USB-compatible elements to one computer at the same time, but this again is not a satisfactory way to store such memory elements as the collection of them accumulates. Further, each such element must still be connected electrically to the computer to learn its identity and contents.

There is thus a need for a system or method of organizing a multiplicity of memory elements that overcomes the above deficiencies.

SUMMARY OF THE INVENTION

In one embodiment, an active, portable, stand alone memory device storage unit is provided, comprising a housing, a plurality of memory device receptacles installed in a surface of the housing, a touch sensitive display installed in an outer surface of the housing adjoining the first surface and operative to display a sequence of graphic displays including in order a menu map of the memory device receptacles, a directory of a compact memory device occupying a selected memory device receptacle, and at least one content page of a selected directory item, and a processor circuit coupled to the plurality of receptacles and to the touch sensitive display and enclosed within the housing.

In another aspect the processor circuit further comprises a first circuit for controlling the touch sensitive display in response to a user selection entered upon the touch sensitive display, and a program responsive to the user selection, to control display of information from at least one memory device installed in a memory device receptacle, the information including a memory device identifier and a receptacle indicator associated with the memory device, and at least a directory of the contents of the memory device.

In another embodiment, a method is provided for storing and displaying contents of a plurality of compact memory devices in a portable, stand alone device without requiring connection to a computing device, comprising the steps of installing the memory devices in an active stand alone memory device storage unit having a plurality of receptacles for the memory devices and a touch sensitive display screen coupled to the plurality of receptacles; and displaying in a main menu on the display screen a memory device icon associated with each installed the memory device.

The method of the present invention further includes the steps of touching a memory device icon on the display associated with an installed memory device to request display of the contents of the memory device, displaying a directory of the contents of the memory device on the display, touching the display screen at a listing of the directory to select an item corresponding to the listing for display on the display screen, and displaying the selected item corresponding to the listing.

DETAILED DESCRIPTION OF THE INVENTION

Figure 1:
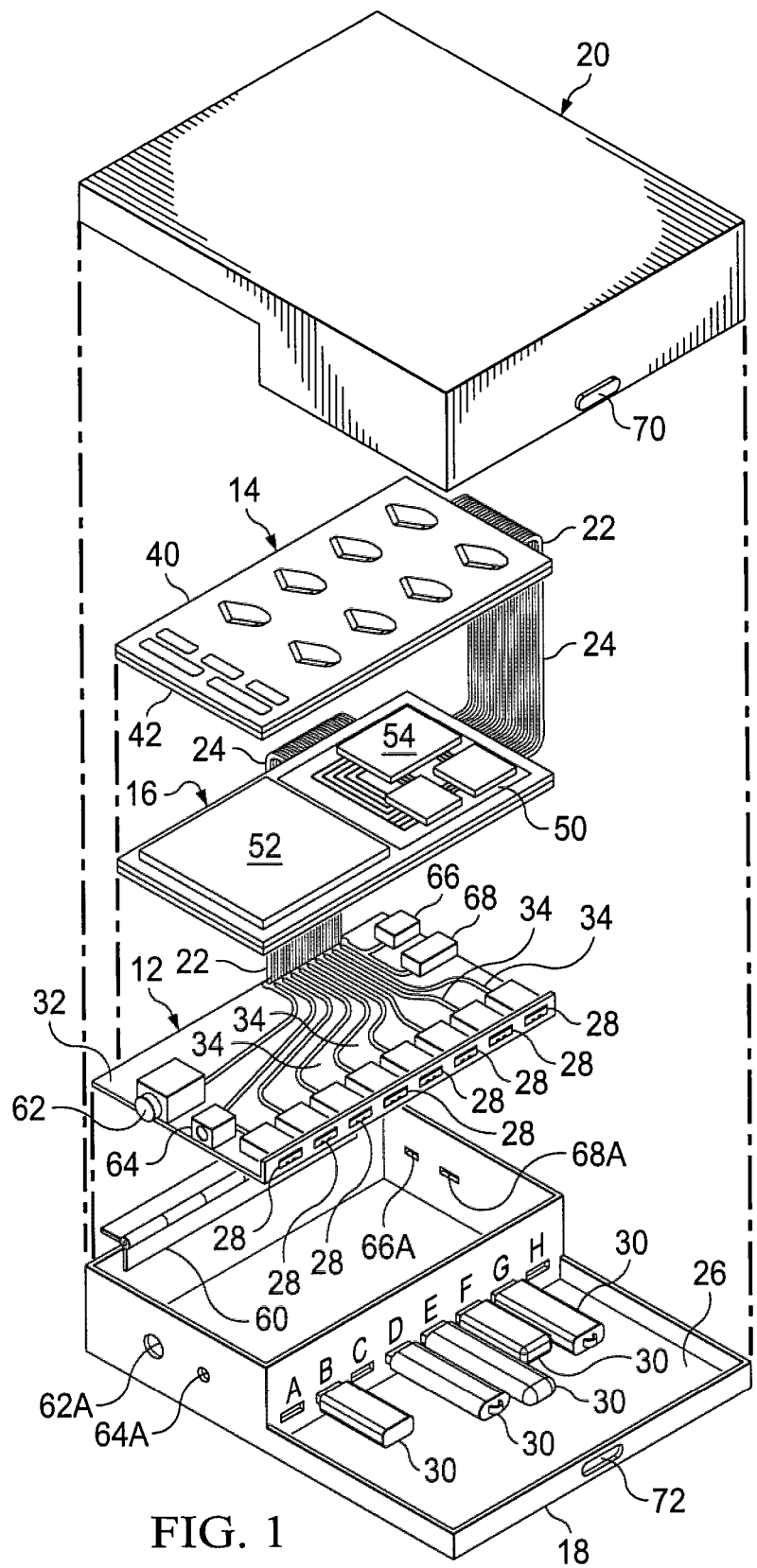
FIG. 1 illustrates a pictorial, exploded-view diagram of a first embodiment of the present invention.

The invention described herein, a portable, stand alone personal library system for storing compact memory devices such as the popular and convenient "thumb drives" or "flash drives," or any of a number of equivalent memory devices, that are available now or will become available in the future. For the purposes of this description, a compact memory device (a "CMD" or just "memory device") is usually (but not so limited) a non-volatile memory unit implemented as semiconductor memory configured as a semiconductor memory chip, generally mounted on or manufactured as a circuit card approximately the size of a postage stamp for convenient use in small electronic devices such as a laptop computer, a mobile (e.g., cellular) phone, cameras, and other products containing digital circuitry where space is limited. Compact memory devices are well known and readily available for such products. One illustrative example featured in the description is the well-known "flash drive," a compact, non-volatile memory packaged with a Universal Serial Bus ("USB") and connector (usually a male connector). This compact memory device is ubiquitous in today's market because of its versatility, high capacity, ease of use, and pocket size. As memory and communication technologies develop, other compact memory devices, including those that may be manufactured in technologies other than semiconductors, may become available that provide the same advantages, yet also are susceptible to storage in a system as described herein.

The preferred embodiment described in FIGS. 1-9 depicts a compact, portable system 10 for storing a plurality of memory devices in a "library" or storage unit that permits ready and convenient access to the memory devices without having to plug them into or otherwise connect them to a computer system. The system includes the combination of three sub-assemblies—a plurality of memory device receptacles, a touch sensitive display screen (touch sensitive display, or display assembly), and a processor circuit coupled to the array of receptacles and the display. The processor circuit controls access to, display of, and reading of the contents of the memory devices occupying the receptacles, as well as operations to copy, paste, and print selected portions of the contents. The touch sensitive display provides an interface with the processor circuit to perform viewing of directories, documents, and control indicia for operating the functions provided by the system. In one preferred but non-limiting embodiment these elements may be enclosed in a housing, chassis, or cabinet. The system may be self-contained and may include ports or receptacles for connecting to external devices such as a computer or printer, or to external power sources to supply operating power or for charging an internal battery.

Thus, the system provides a means by which the user can conveniently store his or her compact memory devices in the system, and read out the identity and contents, for example either as a table of contents, pages of a document, or more detailed information such as specified excerpts, etc. The touch sensitive display enables selection of any particular one of the memory devices plugged into the system merely by touching the display at an icon associated with a particular receptacle. Additional functions may be available to the user according to a program instruction stored in the memory associated with the processor circuit. Moreover, the system may be preferably packaged in a variety of ways. In the present illustrative description the system is packaged as a storage box—a portable and stand-alone unit for maximum utility, convenience, protection of private information, and safety and security. The system may be constructed to permit locking of the container to allow access only with a key or combination code, thereby providing limited access to its contents and function.

To summarize the advantages of the invention, it provides convenience—the ability to quickly access and read the contents of several memory devices (e.g., flash or thumb drives) without having to locate a computer to plug them into. It is portable, providing the user the ability to carry it with or on his or her person. Since it can be locked and may be constructed of heat, fire, or water proof materials, it provides substantial security from damage by these elements. The system described herein also provides privacy of the contents of the memory devices and the ability to access and read the data, because only the user can see the contents without the need to use any other device for accessing and viewing the contents.

Although the embodiments illustrated in the included drawings identify USB (the industry standard Universal Serial Bus)—compatible drives or the so-called flash or thumb drives, the invention is not so limited to these particular memory drives or elements, as any memory element that employs a connector to interface with a computing device to identify and read the element may utilize the apparatus and method of the present invention as described herein and set forth in the appended claims. The drawings illustrate an exemplary embodiment and are not intended to limit the invention to a single configuration. Persons skilled in the art will recognize other possible ways to form the apparatus than the ones depicted herein without departing from the concept of providing a stand-alone storage unit for a plurality of memory devices that can be used for ascertaining the content of each memory device without having to connect it individually with a computer system. Further, the system described herein may be used to copy, paste, or print selected portions of the memory device content using the invention to be described in detail below. In the description which follows, reference numbers appearing in more than one figure refer to the same structures.

FIG. 1 illustrates a pictorial, exploded-view diagram of a first embodiment of the present invention. The memory library and reader system 10 ("system 10"), which may also be called a "Flash Box," or a stand alone memory device storage unit, is shown in the figure. It includes the array of receptacles 12, the touch sensitive display 14 ("display 14"), and the processor circuit 16 coupled together and which may be housed in a housing or chassis 18, perhaps having a hinged cover 20 attached to the chassis 18 by the hinge 60. The system 10 may alternately be called a "memory hub 10," the receptacles 12 a "memory card 12," and the processor circuit 16 a "motherboard 16." The housing or chassis 18 may also be called a "main frame 18." The processor circuit 16 may be connected to the plurality of receptacles 12 by a first connection component or cable 22 and to the display 14 by a second connection component or cable 24. While cables 22, 24 may be used in some embodiments, in other configurations the connection components 22, 24 may be replaced by connectors without any intervening wiring or cabling.

Continuing with FIG. 1, the depicted embodiment shows the chassis 18 that is formed to have a memory bay 26 (analogous to the "stacks," of a library), to provide space for the memory devices 30 plugged into individual receptacles 28 that are arrayed on the receptacle card 32. While the memory receptacles 28 are shown as being all of the same type, it is contemplated that the array 12 may include several types of receptacles to accommodate different types of memory devices 30. The individual receptacles 28 may be supported or mounted on a receptacle card or frame 32 that includes receptacle circuit traces or paths 34 between the receptacles 28 and the first connection component 22. The system 10 depicted in FIG. 1 is provided with eight receptacles 28, but this number is merely for purposes of illustration because the number of receptacles may easily be varied to suit particular circumstances. Further, the receptacle card 32 may support other components such as an ON/OFF button 62, an external power connection 64 (e.g., a battery charger or external source), a connector 66 for providing a connection to an external computer, printer, or other device for file transfer, copying, or printing, or a USB connector 68 for use in charging a battery from an external computer. In one non-limiting example the receptacle card 32 may be a printed circuit board. The receptacle card 32 may be enclosed within a portion of the chassis 18 as shown. These connection components 62, 64, 66, and 68 may be positioned to align with respective openings 62A, 64A, 66A, and 68A provided in the chassis 18 as shown in FIG. 1.

The touch sensitive display 14 is shown as the uppermost sub-assembly of the system 10 embodiment illustrated in FIG. 1. The touch screen 40, attached to a display board 42, is shown with one embodiment of the graphics corresponding to a main menu 100 (See FIG. 3 to be described) displayed thereon. The display 14 may be coupled to the processor circuit 16 by a second connection component 24 that connects the display board 42 to the processor circuit 16. The touch screen 40 should preferably be of a type that responds to the touch of a user's finger, whether it be a tap, a combination of taps, a dragging or sliding motion along the surface of the display, etc. for entering commands or otherwise interacting with the system 10. The processor circuit 16 may include, in addition to the circuitry (not shown in this view) associated with operating the system 10 (to be described in FIG. 2), a processor circuit board 50, a battery 52, and a micro controller or microprocessor 54.

Figure 2:
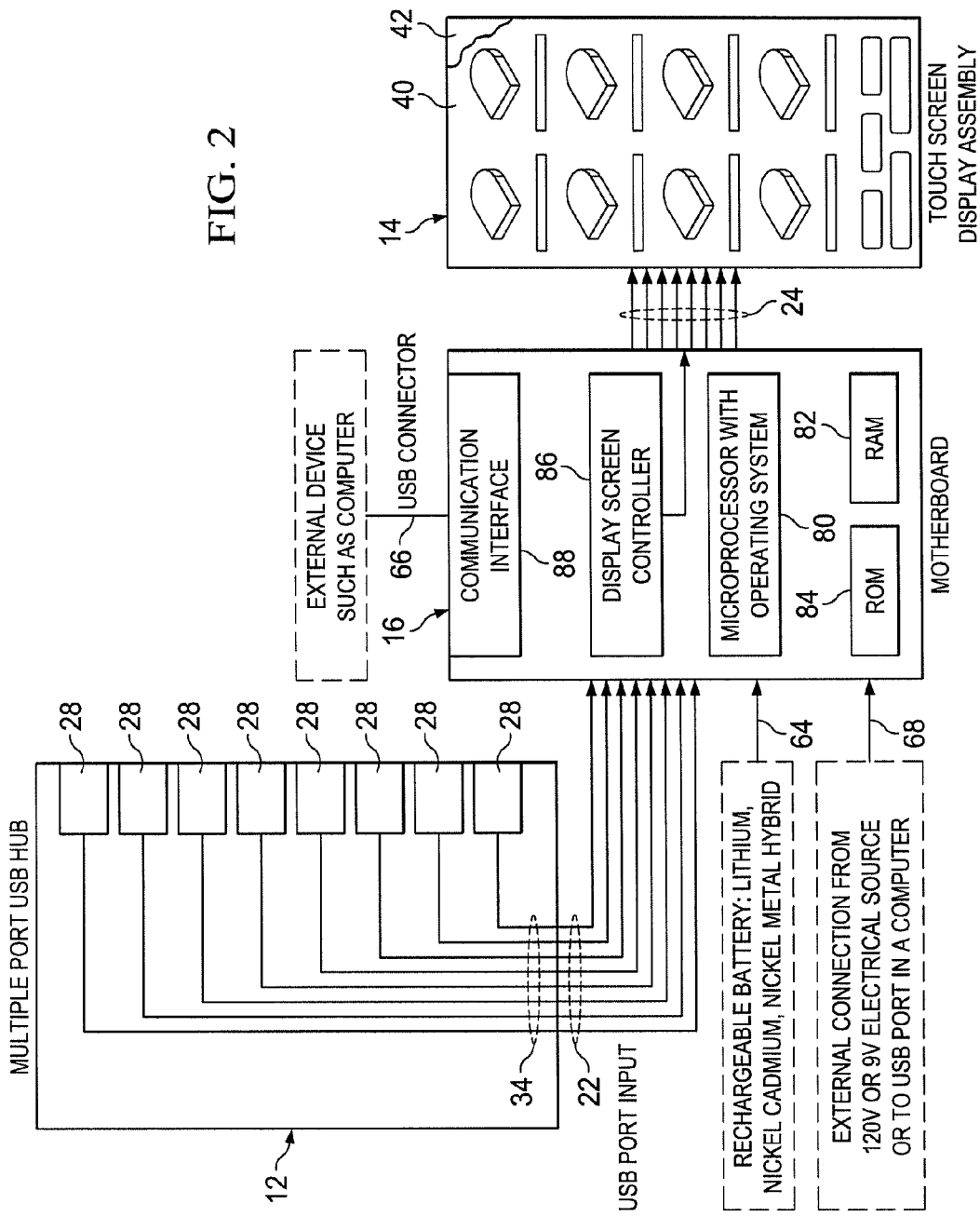
FIG. 2 illustrates a block diagram of control circuitry for the embodiment of FIG. 1.

The micro controller or microprocessor 54 may include RAM and ROM as internal components or be associated with external RAM 82 and ROM 84 (See FIG. 2). The processor circuit 16 is shown in this illustrative view as being disposed between the display assembly 14 and the receptacle card 12. The three sub-assemblies may be enclosed as a compact group within the chassis 18. A cover 20 may be attached to a rear side of the chassis 18 along a hinge 60. Although shown as an opaque cover, the cover 20 may include a transparent section or window to view the touch screen 40 without opening the cover 20. The cover 20 may also include graphics such as a trade name, certain decorative features, and the like. The chassis 18 and cover 20 may be fabricated of sheet metal or molded thermoplastic material. If the chassis 18 and cover 20 are not made of metallic materials it may be necessary to provide shielding for the internal circuitry to comply with Federal RF emissions requirements for electromagnetic interference. Some embodiments may be configured for construction of fire-resistant materials or incorporated into fire proof or water storage containers in the manner of the embodiment shown in FIG. 10 to provide a maximum level of security against damage by heat, fire, or moisture.

FIG. 2 illustrates a simplified block diagram of control circuitry for the system shown in FIG. 1. A block for each of the three main sub-assemblies 12, 14, and 16 is shown, along with major internal components of each one. The receptacle card 12 includes an array of individual memory device receptacles 28 that are coupled to the second connection component 24 via the circuit paths 34. The first connection component 24 connects the receptacle card 12 to the motherboard or processor circuit 16. The processor circuit 16 may include the following structures: a microprocessor or micro controller 80 (54 in FIG. 1), a random access memory (RAM) 82, a read only memory (ROM) 84, a display controller 86, and a communication interface 88. In some implementations the micro controller 80 may include the RAM 82, ROM 84, and the operating system ("O/S") 90, or even the display controller 86 as internal components. As well known in the art, the ROM 84, whether provided within or separate from the microprocessor or micro controller 80, preferably includes an application program (as described in FIGS. 7, 8, and 9) for controlling the operating functions of the system 10.

Continuing with FIG. 2, the processor circuit 16 is preferably coupled to the display 14 via the second connection component 22. It will be understood that the first 22 and second 24 connection components may be cables or connection receptacles or both, depending on the particular construction required by the implementation. The display 14, as previously described may include a touch screen 40 and a display circuit 42. Other features of the system 10 that may be provided, for example but without limitation, include certain ports or connectors for connecting the processor circuit 16 to an external battery (shown in dashed lines because it does not form part of the invention) via port 64; a USB (Universal Serial Bus) port 66 to provide a communication link to an external device (also shown in dashed lines) such as a computer or printer; and another USB port 68 for connecting to an external computer to access a remote recipient or destination for a selected portion of the contents of a memory device installed in the system 10, or even to access a source of operating voltage for the system 10. Depicted on the touch screen 40 is one example of a main menu graphic display 100 to be described in FIG. 3.

The communications interface 88 may include an RF transmitter and antenna for wireless communication with an external device. Alternatively, the communications interface may include an optical transmitter and an output device for coupling the output of said transmitter to an optical transmission line. Further, the communications interface 88 may be configured through an internal program or additional structure to enable connection to a computer to enable an alternative (but not required) use of the system 10 as flash drive hub when plugged into the computer. In this mode of operation, the computer may be configured by the system 10 to present the same sequence of displays as the screen provided on the system 10. Most computers are typically equipped with only two USB ports, so the communications interface 88 would enable expansion of the capability of the computer via the hub abilities of the system 10. Because of their size, computers are not as readily carried or transported as the first and third embodiments of the storage unit described herein.

Figure 3:
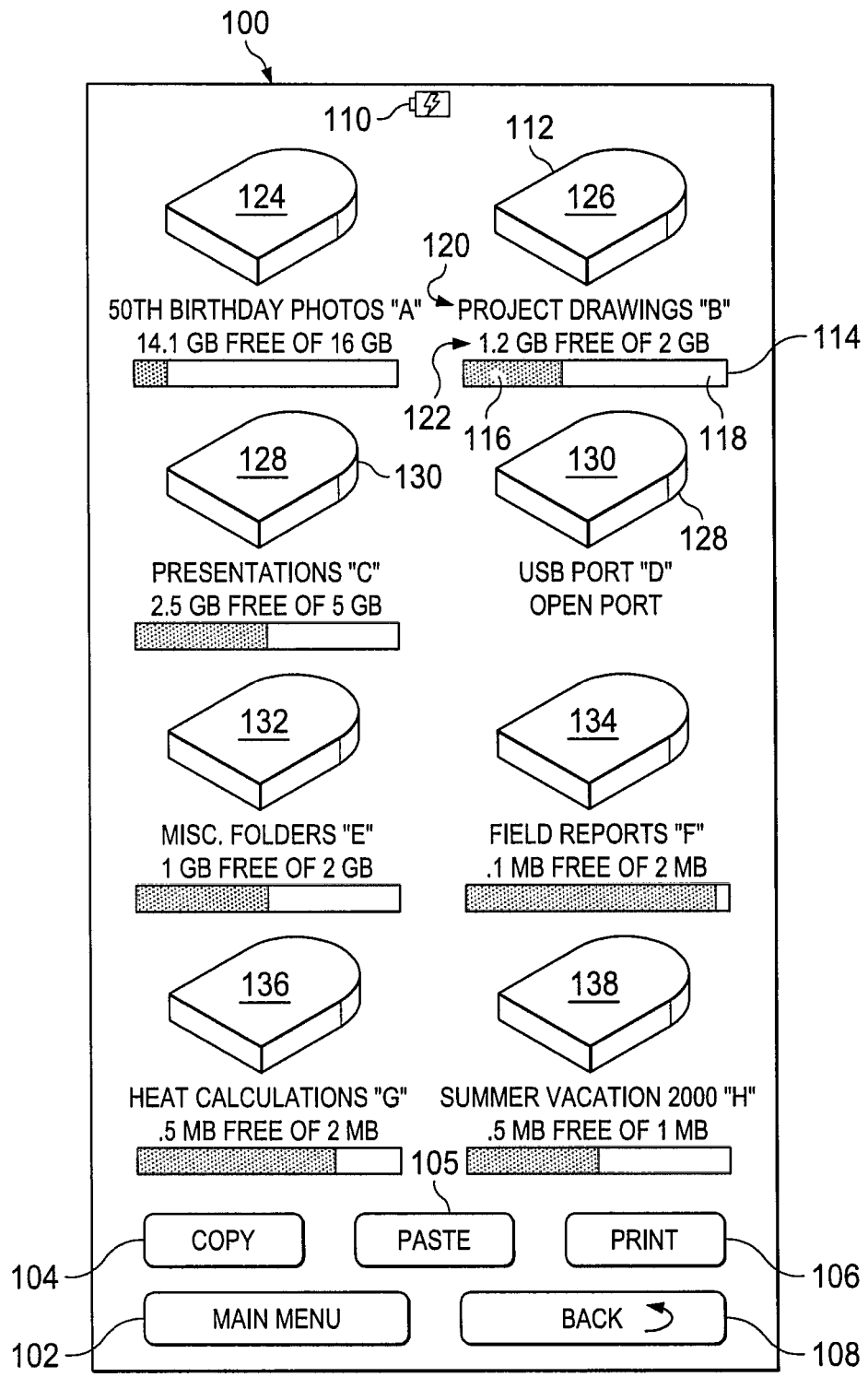
FIG. 3 illustrates a graphic depicting one embodiment of a screen image upon activation of the embodiment of FIG. 1.

FIG. 3 illustrates a graphic depicting a screen image for a main menu 100 upon activation of the embodiment of FIG. 1 by pressing the ON/OFF button 62 (See FIG. 1). The displayed screen graphics may include images of icons representing each memory device receptacle 28, whether occupied or not, and various commands to operate the system 10 or the functions performed by the system. Touching the screen 40 (See FIG. 1) at the location of an icon image selects that memory device or initiates a command or function represented by the touched icon image. In some cases touching the screen 40 twice or in two different locations, or dragging one's finger mat be required and implemented in the operating or application program to initiate or perform the command or function (see FIGS. 7, 8, and 9). Included at the lower end of the screen 40, in most of the screen displays are a set of command buttons for the functions MAIN MENU 102, COPY 104, PASTE 105, PRINT 106, and BACK 108, all of which are well-known, intuitive commands. In addition, at the upper end of the screen 40 may be an indicator 110 such as an LED behind the screen or an image illuminated by a light emitting device behind the screen 40 to indicate operation of a battery charger, the condition of the battery, and the like. Other indicators of this type may also be included in alternate embodiments.

Also on the main menu display 100 in FIG. 3 are eight icons, bearing reference numbers 124, 126, 128, 130, 132, 134, 136, and 138. Each icon 124-138 corresponds to one of the receptacles 28 in the system 10 for receiving a memory device 30 for storage in the system. When a memory device receptacle 28 is occupied, the memory device icon 112 may become illuminated, change color, or display an altered image to indicate the occupation of the receptacle 28 in the receptacle card 12. Each of these memory icons 112 may be accompanied by a horizontal bar graph image 114 that may have a darkened (or colored) portion 116 representing an occupied portion of the memory capacity of the memory device 30 and an undarkened (or uncolored) portion 118 representing the remaining capacity (or unoccupied portion) of the memory device 30. For example, the bar graph 114 for memory device 126 indicates 0.8 GB (giga byte) occupied and 1.2 GB free. Also included in the screen display disposed between the memory device icon 112 and its corresponding bar graph 114 may be a line of text 120 stating the name or other identifying statement assigned to the memory device. For example, memory device 126 is identified as: Project Drawings "B." In another example, the text below the icon for memory device 130, which indicates that no memory device 30 is plugged into the corresponding receptacle 28, displays the (default) statement: USB Port "D" and, in place of a bar graph 114, just the statement: Open Port. Other memory device icons 112 for the receptacle ports 124 and 128, 132, 134, 136, and 138 have similar features as described in the foregoing examples. These examples, not intended to be limiting, are provided to illustrate one embodiment for a main menu display screen.

In operation, the user may install or remove a memory device 30 from one of the receptacles 28. This action will be accompanied by a change to the memory device icon 112 corresponding to that particular receptacle 28, when the system 10 is turned on or activated. The change when a memory device 30 is inserted into a vacant receptacle 28 on the receptacle card 12 may include the appearance of a line of text 120 indicating the identity of the memory device 30, and the appearance of a bar graph image 114 to indicate the occupied capacity 116 of that memory device 30. The observant reader will note that each memory device position may be identified with an alpha numeric symbol such as the letters A, B, C, . . . H, as shown in FIG. 3. Such indicating symbols may also be used elsewhere in the system to relate the receptacle positions to the main menu display, for example.

Figure 4:
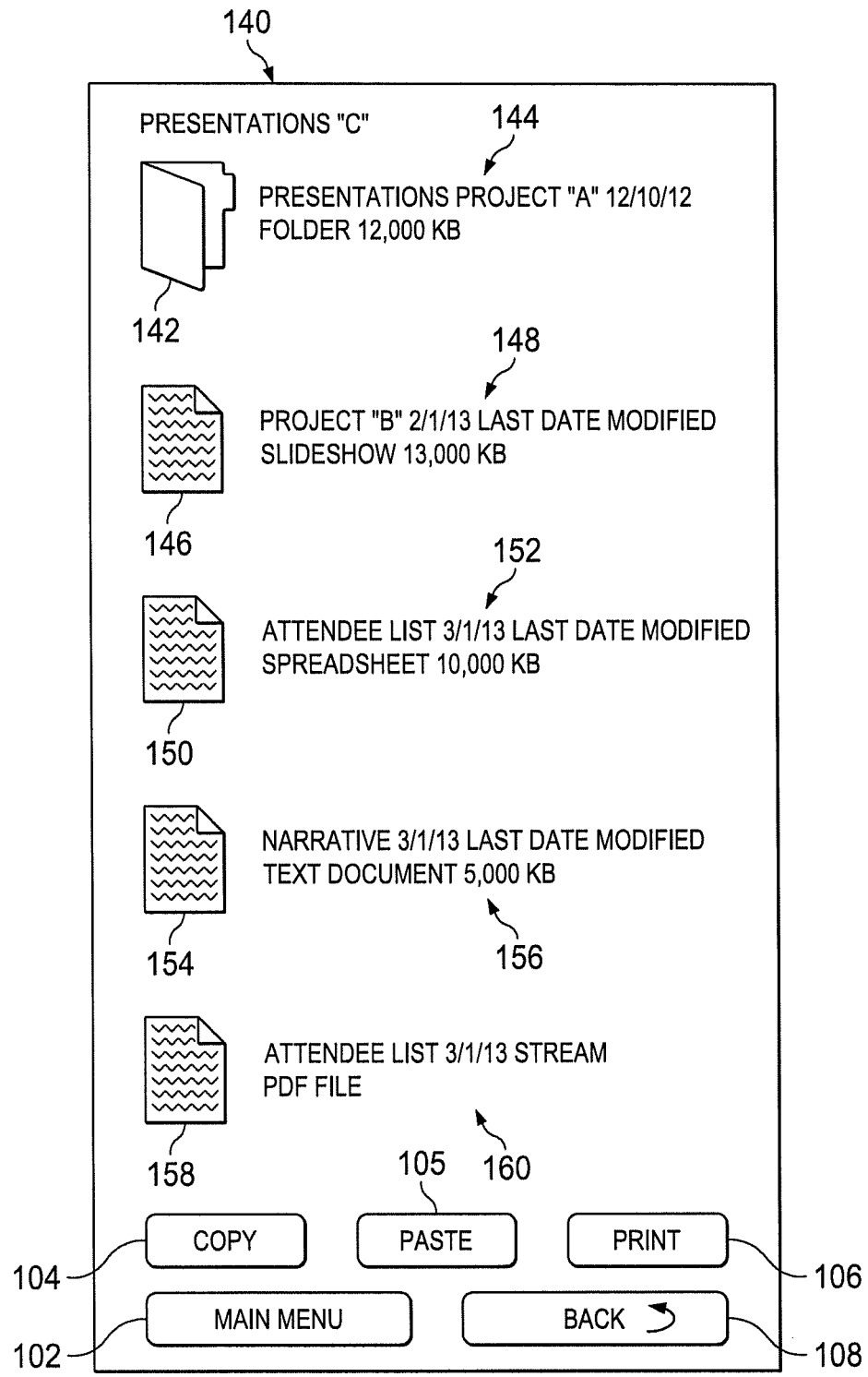
FIG. 4 illustrates a directory of contents of a selected memory device connected to the embodiment of FIG. 1.

FIG. 4 illustrates a device directory display 140 depicting a directory of contents of a selected memory device connected to the embodiment of FIG. 1. The selected memory device, "Presentations," installed in the "C" position in the receptacle card 12, includes a number of folders or other files designated by the reference numbers 142, 146, 150, 154, and 158 in this example. Each folder or file may be described by textual and/or numeric indices respectively 144, 148, 152, 156, and 160 as shown in FIG. 4. For example, folder 142 entitled Presentations, Project "A," is dated Dec. 10, 2012 and occupies 12,000 Kilobytes (KB) of memory space, as described by the description indices 144. In another example, a Power-Point® file 146 entitled simply "Project B" is dated Feb. 1, 2013 and occupies 13,000 KB of memory space, as described by the indices 148. Other entries in the device directory display 140 include an Attendee List 150, which may be, for example, an Excel® spreadsheet 152, a Narrative 154/156, and another Attendee List 158/160 in Adobe format. Note: PowerPoint® and Excel® are registered trademarks of Microsoft® Corporation. Adobe is either a registered trademark or a trademark of Adobe Systems Inc. Touching the device directory display 140 at the location of the icon image initiates the corresponding command or function. In some cases touching the directory display 140 twice or in two different locations, or dragging one's finger is required to initiate the command or function. As in screen 40 a set of command buttons for the functions MAIN MENU 102, COPY 104, PASTE 105, PRINT 106, and BACK 108 may appear at the lower end of the device directory display 140.

Figure 5:
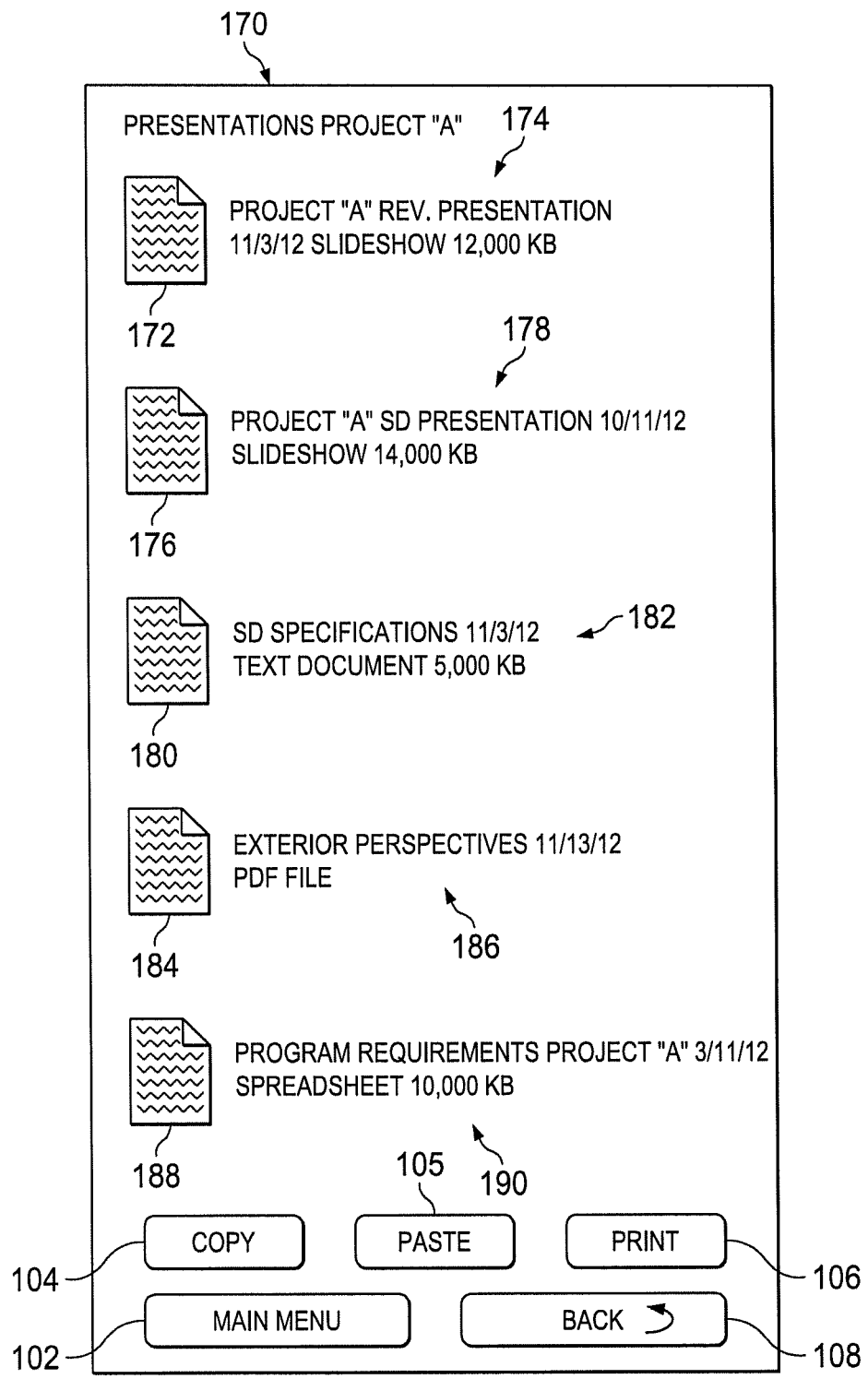
FIG. 5 illustrates a directory of contents of a selected folder in a selected memory device connected to the embodiment of FIG. 1.

FIG. 5 illustrates a folder directory display 170 depicting the directory of the contents of a selected folder 142 in a selected memory device connected to the embodiment of FIG. 1. The selected folder 142 entitled Presentations "Project A," is seen in the folder directory display 170 to include a number of documents 172, 176, 180, . . . 188, respectively identified by the indicia 174, 178, 182, . . . 190 in the same manner is described in FIG. 4. Touching the lower end of the display 170 at the location of a button image initiates the corresponding command or function. In some cases touching the folder directory display 170 twice or in two different locations, or dragging one's finger from one indicia to another is required to initiate the command or function. As in screen 40 a set of command buttons for the functions MAIN MENU 102, COPY 104, PASTE 105, PRINT 106, and BACK 108 may appear at the lower end of the folder directory display 170.

Figure 6:
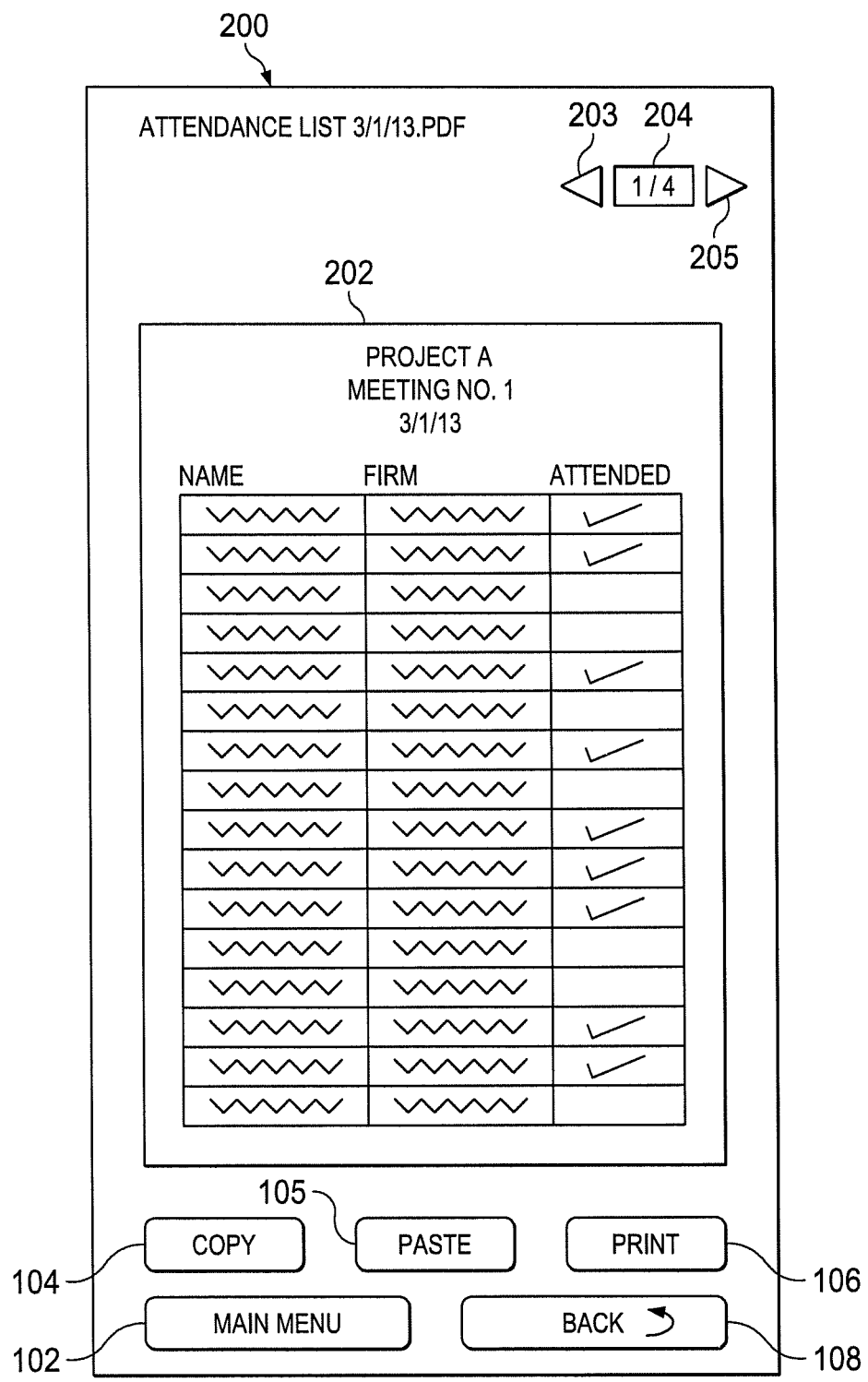
FIG. 6 illustrates a directory of contents of a selected document in a selected folder of a memory device connected to the embodiment of FIG. 1.

FIG. 6 illustrates a document display 200 depicting the first page 1/4 of a selected document 202 such as an Attendee List from a selected folder, e.g., the Project A Presentation 172/174 (See FIG. 5) of a compact memory device 30 connected to a receptacle 28 in the receptacle card 12 of the embodiment of FIG. 1. The page 1/4 may be indicated by the label 1/4 in the upper right hand corner of the document display 200, which tracks the particular page selected by the user. Touching the lower end of the document display 200 at the location of a button image initiates the corresponding command or function. In some cases touching the document display 200 twice or in two different locations, or dragging one's finger is required to initiate the command or function. As in screen 40 a set of command buttons for the functions MAIN MENU 102, COPY 104, PASTE 105, PRINT 106, and BACK 108 may appear at the lower end of the document display 200.

Figure 7:
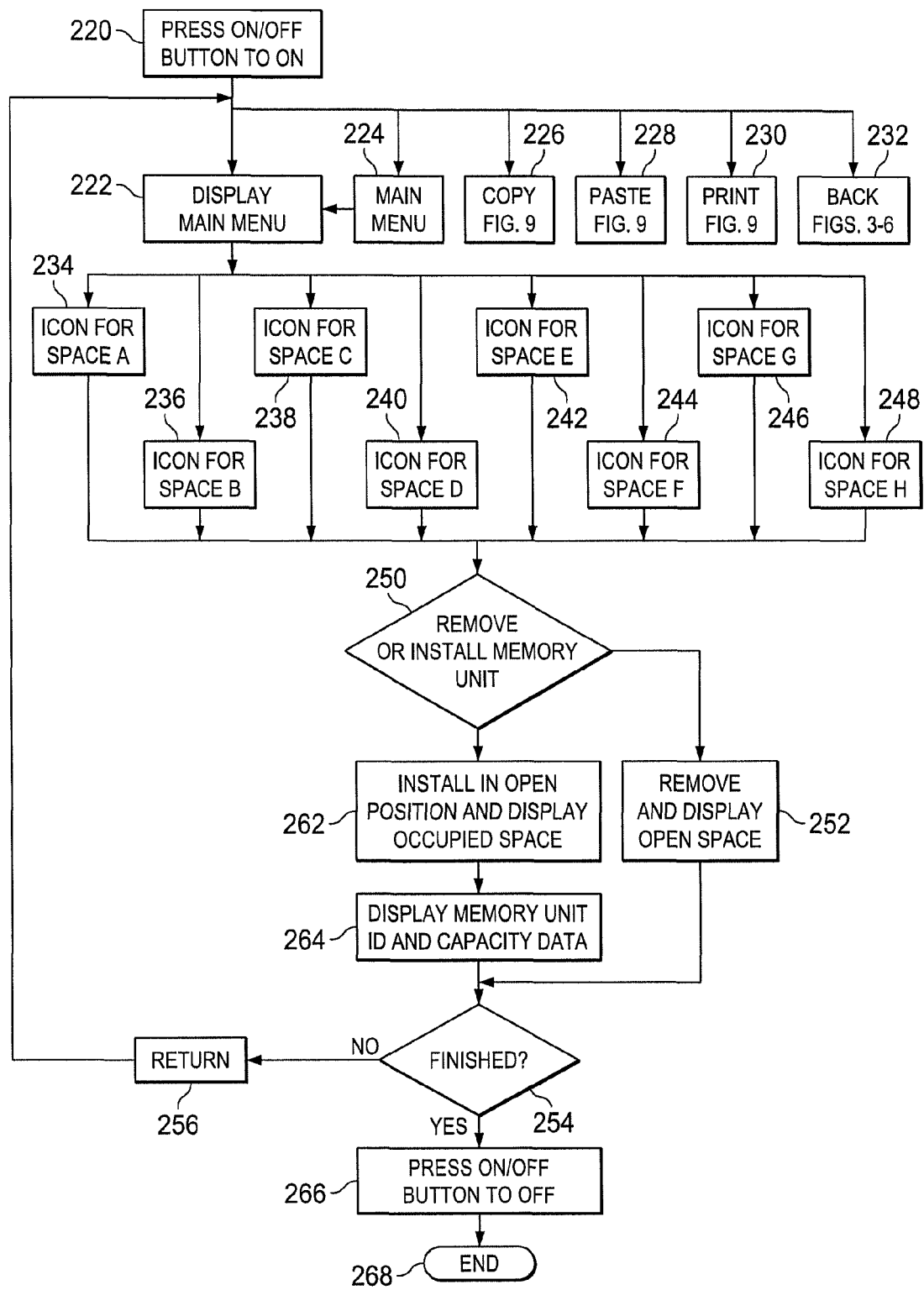
FIG. 7 illustrates a flow chart for navigating a log-on display of hub contents of the embodiment of FIG. 1.

FIG. 7 illustrates a flow chart for navigating a log-on display to access content stored in the system 10 illustrated in FIG. 1. The process may begin at step 220 "press the ON/OFF button 62." The ON/OFF button 62 may be a push on/push off switch, a toggle switch, or a rocker switch supported in the chassis 18 as shown in FIG. 1, or even a touch switch integrated into the touch sensitive display screen 40. When turned ON, the system 10 displays the main menu 100 that presents to the user several options for entering commands merely by touching the surface of the display screen 40 at the location of a button icon that corresponds to the desired operation or function. Options for the next step are provided by the step 222 display main menu, which permits the display of the set of icon images for the memory devices 30 corresponding to the receptacles 28 (occupied or not) in the receptacle card 12. Also accessible from the main menu are icons for a set of command buttons for the functions MAIN MENU 102, COPY 104, PASTE 105, PRINT 106, and BACK 108 that may appear at the lower end of the screen 40. Touching the MAIN MENU button 102 in step 224, for example, returns the screen display 40 to the main menu 100 as shown in FIG. 3. The MAIN MENU button 102 is useful when the user has completed an action with a particular memory device (FIG. 4), or folder (FIG. 5) or document (FIG. 6) and desires to return to the main menu 100 to initiate another action such as accessing another memory device, etc.

Figure 8:
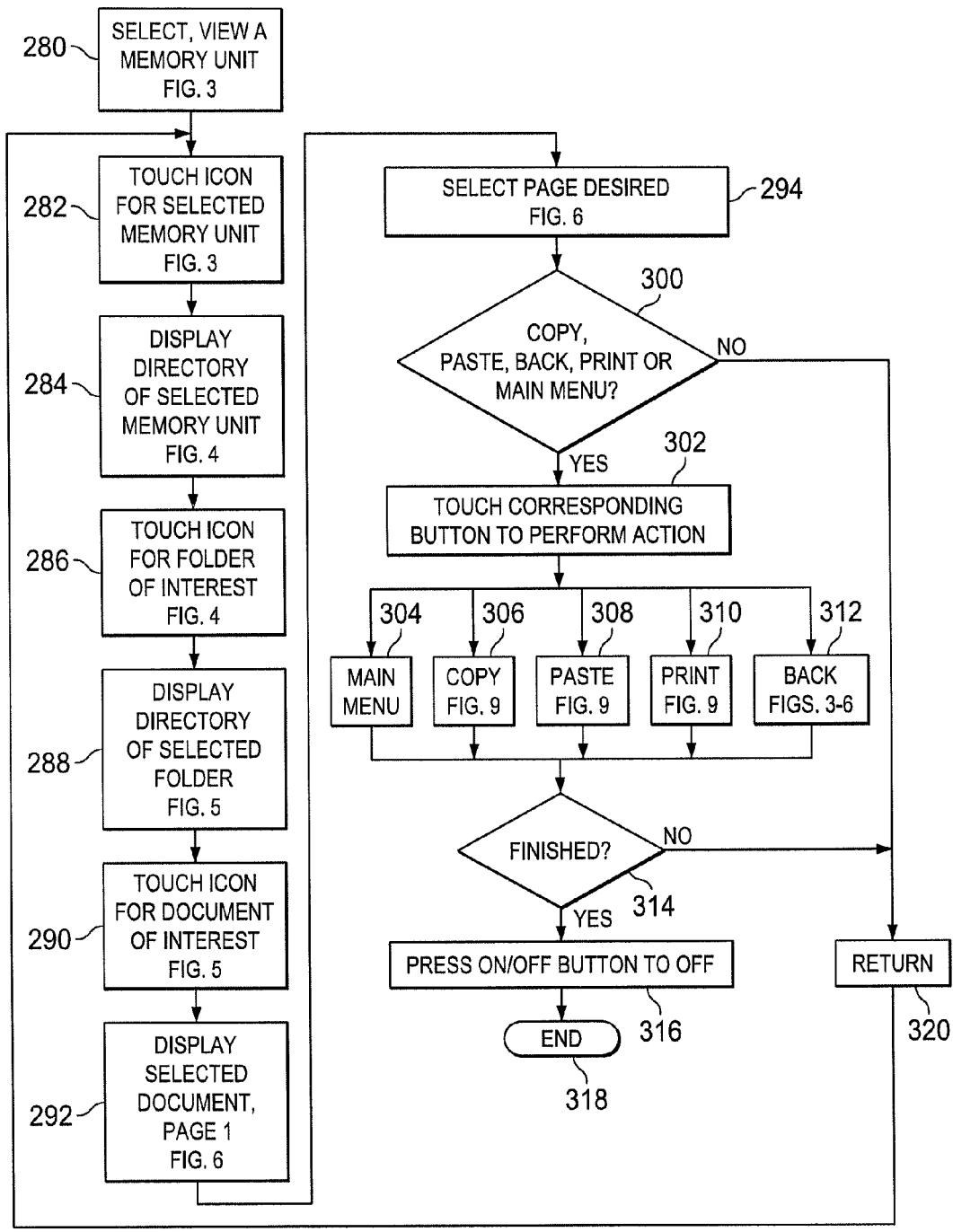
FIG. 8 illustrates a flow chart for operating the embodiment of FIG. 1 in an instance of accessing a selected memory device, folder, or document.
Figure 9:
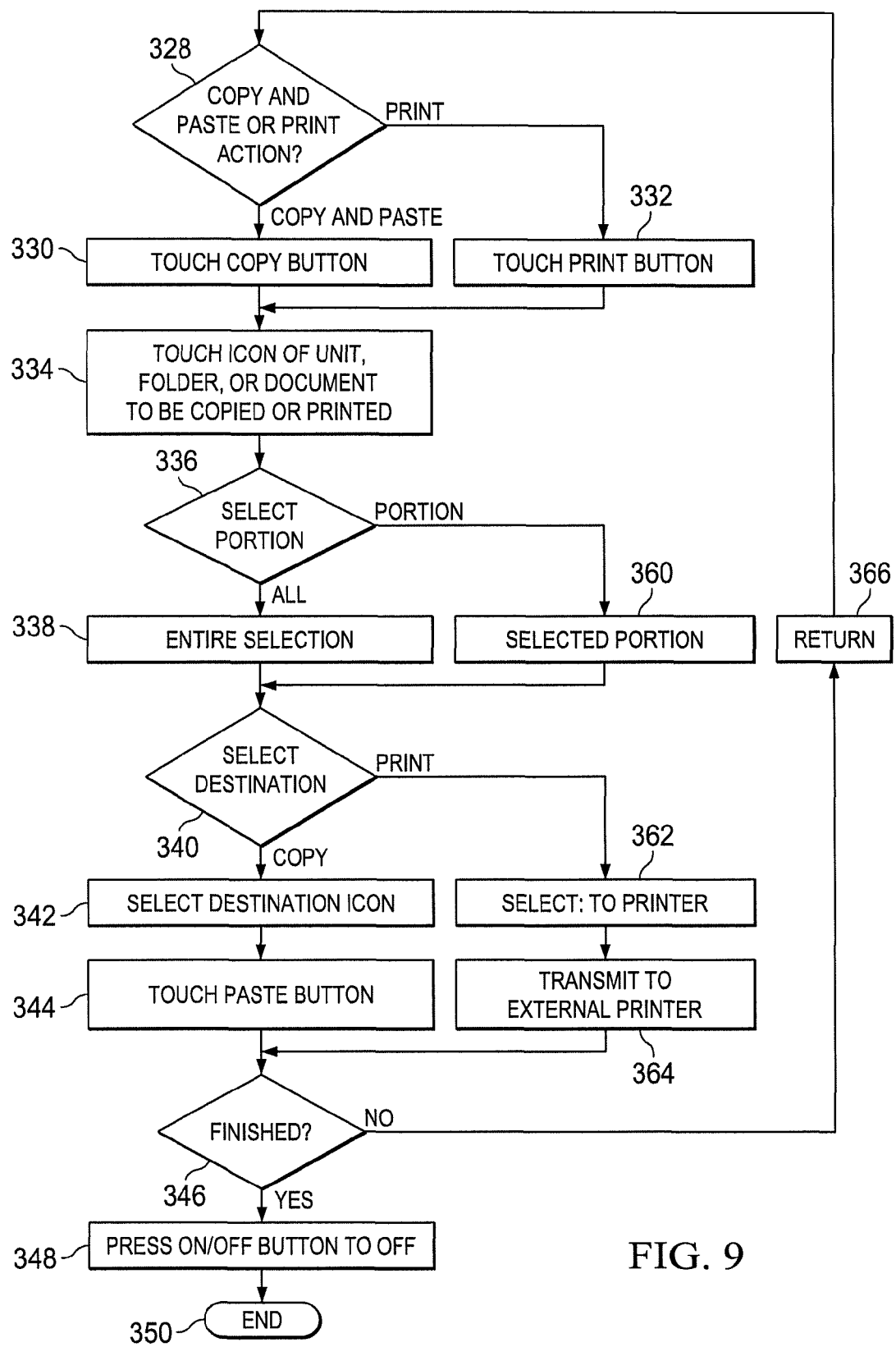
FIG. 9 illustrates a flow chart for "copy and paste," to copy a selected portion of a document, folder, or drive to another location.

Continuing with FIG. 7, touching the COPY button 104 in step 226 enables a command function for copying material from one memory device/folder/document to another as will be described in FIG. 9. Similarly, touching the PASTE button 106 in step 228 enables a command function for pasting material into a destination memory device/folder/document as will also be described in FIG. 9. Touching the PRINT button 105 in step 230 enables a command function for printing selected content of a memory device to an external printer, as will be described in FIG. 9. Touching the BACK button 108 in step 232 provides for stepping back to the previous display or step in the sequence illustrated in FIGS. 3 through 6. Persons skilled in the art will recognize that several of the functions performed as illustrated in FIGS. 7, 8, and 9 may be implemented by configuring the process to touch an icon and then drag the user's finger or stylus (if used but not shown herein) to transfer selected content of a selected compact memory device from one memory device to another memory device or other location. It is also to be understood that functions or commands other than the ones depicted and described herein may be added or substituted without departing from the concepts of the present invention to meet other requirements of a memory device storage system 10.

Continuing further with FIG. 7, at step 222 when the main menu 100 is displayed, the user may next access any one of the memory device spaces 124, 126, 128, . . . , 138 by touching the icon corresponding to the desired destination memory device in a step selected from the set of steps 234, 236, 238, . . . , 248, which respectively correspond to the memory device spaces A, B, C, . . . , or H as shown in the figure. Touching one of these buttons on the main menu 100 causes the system 10 to change the display to the directory 140 of the selected memory device, an example of which is shown in FIG. 4. This process will be further described in FIG. 8. Returning to FIG. 7, the flow advances to step 250, a decision step where the user decides whether to remove or install a memory device 30 in a receptacle 28 of the system 10. If a memory device 30 is to be removed as in step 252, the icon on the main menu 100 changes to display an icon representing an open memory space 130 as shown in FIG. 3. From there the process advances to step 254, a decision step to determine whether the user is finished using the system 10. If NO, the flow proceeds to step 256 to return to display the main menu display 40; if YES, the flow advances to step 266 when the user presses the ON/OFF switch to OFF and the process ends at step 268. On the other hand, if, at step 250 the user decides to install a memory device 30 in an unoccupied receptacle 28 the user locates an unoccupied receptacle 28, installs the memory device in step 262, whereupon the processing circuitry 16 reads the new memory device 30 and displays the identifying data about that memory device in the position of an occupied icon on the screen display. In the next step 254, the system requests the user to decide whether to end the session or return to step 222 as explained herein above.

FIG. 8 illustrates a flow chart for operating the embodiment of FIG. 1 in a sequence for accessing a document (or file) in a selected folder from a selected memory device that is plugged into the system 10. The process begins at step 280 with the main menu 100 displayed on the screen 40, that is, to "Select, View a Memory Unit (See FIG. 3). In step 282 the user may touch an icon corresponding to the memory unit to be selected in step 284. This step will display the directory of the selected memory unit (See FIG. 4). If this is the memory unit the user desires to access, in the next step 286 (See FIG. 4) the user may touch the icon for the folder of interest and the display will show the directory of the selected folder (See FIG. 5) in step 288. In step 290 the user may touch an icon in the directory of the selected folder to select a document or file listed in the directory of the folder (See FIG. 5). Upon selecting the document (or file), the screen 40 will display the first page of the selected document (or file) in step 292 (See FIG. 6) as indicated by the page number box 204. If it is desired to advance to another page, touching the "forward" button 205 in the document display 200 (to the right of the page number label 204) on the screen 40 at step 294 (See FIG. 6) will permit the user to advance to the next page (one touch), to a farther page (touch and hold button 205 until it scrolls to the desired page, then release the touch). If it is desired to return to a previous page, reverse the process of step 294 to return by touching the "return" button 203 in the document display 200.

Once a particular page of interest has been reached and displayed during step 294, the user may choose one of the several commands to COPY, PASTE, PRINT, BACK, or return to the MAIN MENU, by touching the corresponding button on the document display 200 of the screen 40. The decision step 300 allows the user to decide whether to select one of these functions by touching one of the button icons for COPY 104, PASTE 105, PRINT 106, BACK 108, or to return to the main menu 100 by touching MAIN MENU 102. Recall that touching the BACK button 108 will return to the previous directory or to the main menu 100 if the user is at the memory directory 140. Touching the desired button in step 302 advances the process to the MAIN MENU in step 304, to the process to COPY in step 306 (FIG. 9), to PASTE in step 308 (FIG. 9), to PRINT 310, or to BACK in step 312 (to one of FIGS. 3-6 as applicable). If the user is finished (YES) in step 314 the user may press the ON/OFF switch 62 in step 316 and the process ends in step 318. If the user is not finished (NO) in step 314 the user may return in step 320 to re-enter step 282 at the beginning of FIG. 8.

FIG. 9 illustrates a flow chart for the COPY and PASTE or PRINT functions to copy (or print) a selected portion of a document, folder, or drive and to paste or transfer it in another document, folder or memory device, or send it to a printer for printing. The process begins at a decision step 328 followed by the selection of the COPY & PASTE or PRINT function by touching the COPY button icon 104 or the PRINT button 106 on the screen 40. This action may be performed on either of the displays for the memory device directory 100, the folder directory 140, the document directory 170 or the selected document 200. After touching the COPY button 104 in step 330, the flow advances to step 334 in which the user may touch the icon of the memory device or unit, folder, or document to be copied. Step 334 leads to step 336 to determine whether the user wishes to select all of the item or a portion of the item to be copied. If ALL is selected in step 338, or a PORTION is selected in step 360 the process advances to step 340 to select a destination of the copied item, whether it is to COPY to a memory device in the system 10 via step 342 or whether it is to PRINT to an external printer via step 362.

Continuing with FIG. 9, if the destination selected is "COPY," the user may select a memory device icon at the memory directory 100 in step 342 followed by touching the PASTE button 106 to transfer the selected contents to the destination memory device. Thereupon the flow advances to decision step 346 to determine whether the user is FINISHED executing the desired process. If YES, the flow steps to block 348 to press the ON/OFF switch to OFF and the routine ends at step 350. If NO, the process advances to step 366 to return to step 328, or, alternatively, the user may touch the BACK 108 or MAIN MENU 102 buttons to return to the screen 40 for further operations. Going back to the "Select destination" step 340, if the user selected "PRINT," the process advances to step 362 to select a printer (or other external destination), followed by selection of "Transmit to External Printer" in step 364. The flow then proceeds as previously described, to END (step 350) or RETURN (step 366). The external destination devices (not shown because they are not part of the present invention) are accessible via the USB port 66 via the communication interface 88 under the control of the processing circuit 16 (See FIG. 2). In other embodiments that include an RF transmitter in the communications interface 88 as described in FIG. 2, wireless connection to external devices would be facilitated.

Figure 10:
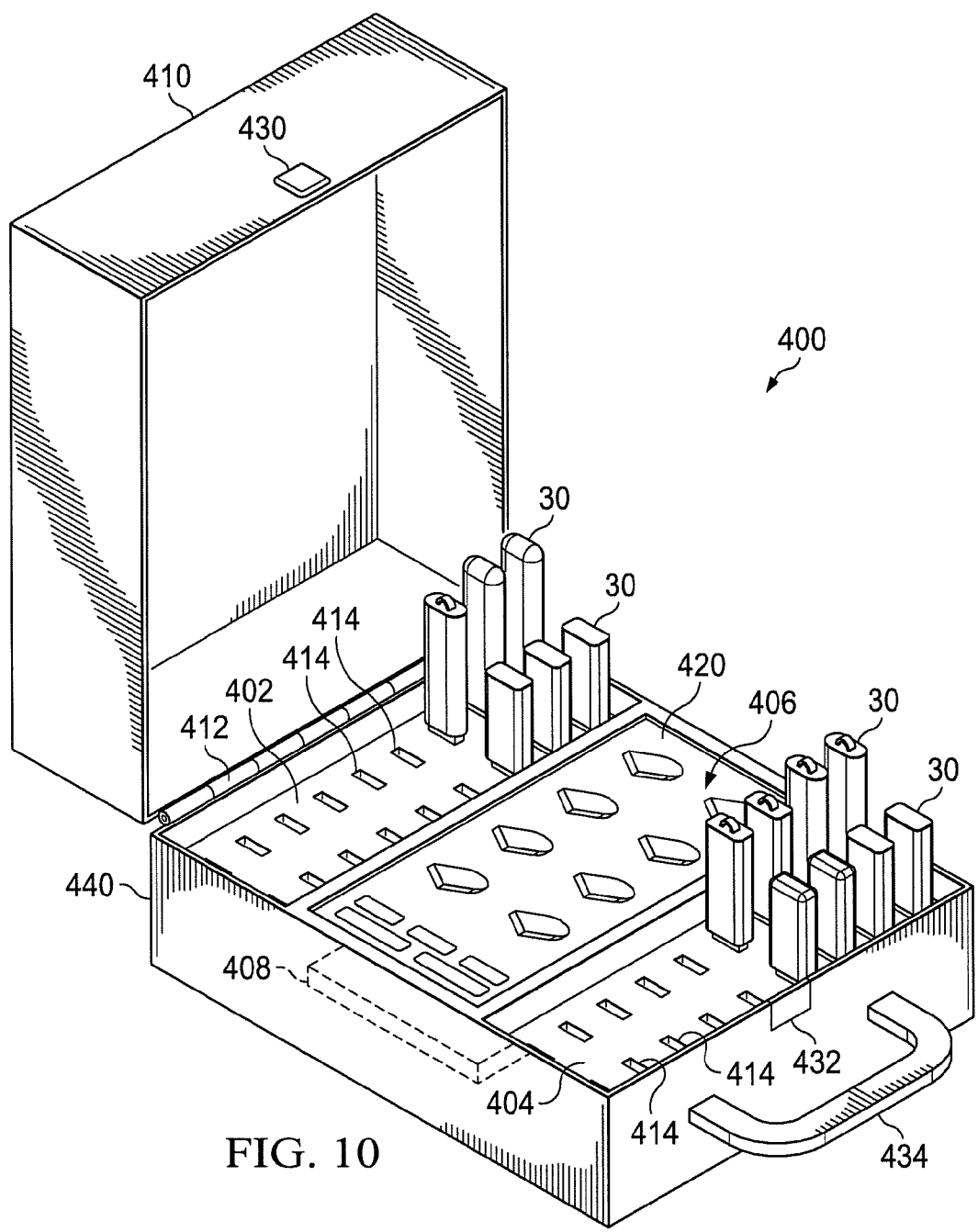
FIG. 10 illustrates a second embodiment of the present invention for use as a desk-top model.

FIG. 10 illustrates one variation of a second embodiment of the present invention for use as a desk-top model, which contains the same basic features and operation as the preferred embodiments described in FIGS. 1-9 that depict a portable system 10. System 10 illustrates storage of a plurality of memory devices such as "Flash Drives" in a compact "library" unit that permits ready and convenient access to the memory devices without having to plug them into or otherwise connect them to a computer system. The desktop system 400 illustrated in FIG. 10 provides greater storage space for memory devices (i.e., more "shelves" in the library) while retaining the same ready and convenient access to "the stacks" in the library as described herein above for the portable system 10. Some embodiments of the present invention may be configured for construction of fire-resistant materials or incorporated into fire proof or water storage containers in the manner of the embodiment shown in FIG. 10 to provide a maximum level of security against damage by heat, fire, or moisture. For example, the desktop embodiment illustrated in FIG. 10 may include a fireproof cabinet 440, constructed of materials suitable for storage of the memory devices accommodated by the storage unit described herein. Alternatively, the storage unit may be sized and shaped to fit conveniently within a small fire safe.

The desktop unit 400 depicted in FIG. 10 includes first 402 and second 404 bays or galleries disposed on either side of a touch sensitive display screen assembly 406 and each bay containing a plurality of sockets such as USB port receptacles 414. The bays 402, 404 and screen 406 may be contained or supported in a housing or cabinet 440. A processor circuitry 408 shown in dashed outline may be disposed within the cabinet 440 below the display screen 406. The cabinet 440 may have a lid 410 attached to the cabinet 440 along a hinge 412 and secured with a latch mechanism having a first part 430 disposed on the lid 410 and a second corresponding part 432 disposed on the cabinet 440. The cabinet 440 may have carrying handle 434 as shown. The system 400 may be activated to display a main menu graphic 420 on the display screen 406. In the illustrated embodiment six USB memory devices 30 are plugged into USB receptacles 414 in the first bay 402 and eight USB memory devices 30 are plugged into USB receptacles 414 of the second bay 404.

Operation of the system 400 is essentially identical as the system 10 described herein above. Further, as noted previously, the embodiment of FIG. 10 may be constructed in a variety of configurations. For example, in the arrangement, spacing, and dimensions of the touch screen and the memory device receptacle areas, the disposition of the various assemblies within the housing or cabinet may vary from that shown, it being understood that many variations of the illustrated combination are possible. Thus, a particular implementation may appear different than that shown in FIG. 10 without departing from the concept and principles of the present invention.

Figure 11:
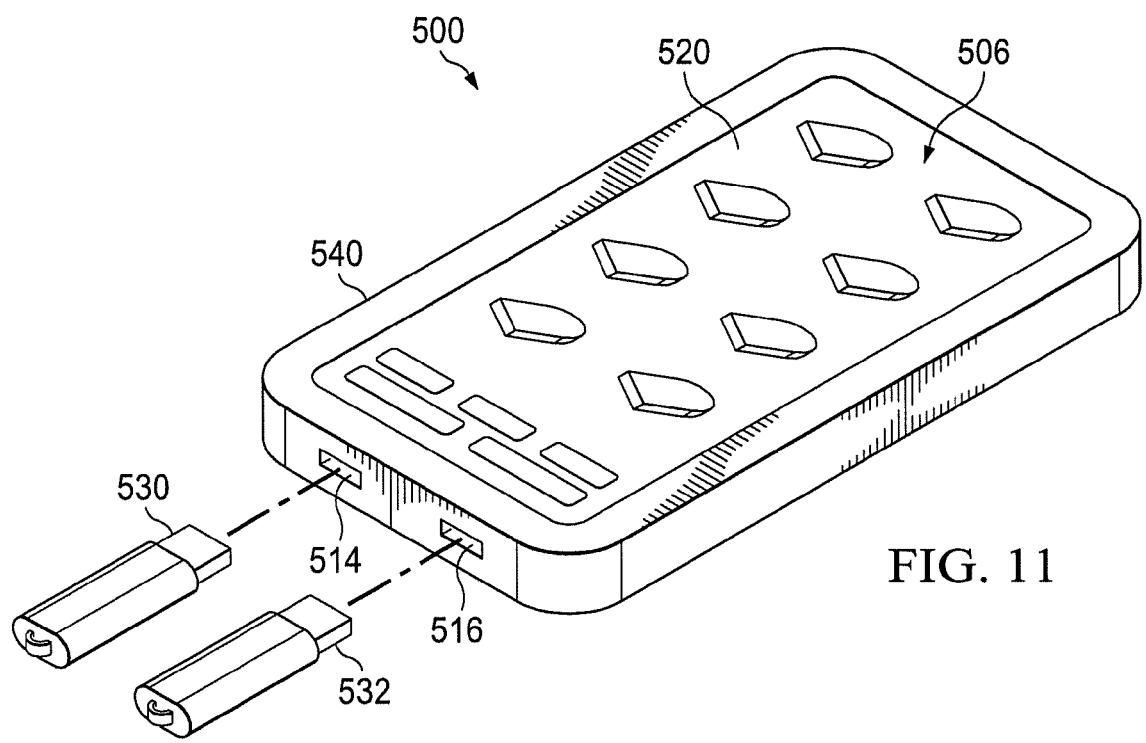
FIG. 11 illustrates a third embodiment of the present invention for use as a pocket model.

FIG. 11 illustrates a third embodiment of the present invention for use as a pocket model. This system 500 is intended to be functionally the same as the system 10 but may be equipped with a smaller screen display and, in one non-limiting aspect, only two receptacles for memory devices. One unoccupied memory device may be supplied with the system 500 and installed in a first receptacle so that installation of an occupied memory device in a second receptacle may be processed to transfer some or all of its contents to the unoccupied memory device, or simply stored in the system 500. The system 500 is designed to be pocket-sized to facilitate its use as a fully portable unit. The system 500 is housed in a case 540 and includes first 514 and second 516 receptacles for receiving first 530 and second 532 USB "Flash" or "Thumb" drives or their equivalent. The receptacles 514, 516 may be recessed into the body of the case 540 for a smoother appearance when a memory device 530, 532 is installed. Receptacle 514 may be defined to receive a source memory device 530 and receptacle 516 may be defined to receive a destination memory device 532. The case 540 further preferably includes a touch sensitive display screen 506 for displaying a screen image 520 displaying the main menu graphic and the same associated displays as shown in FIGS. 3, 4, 5, and 6 described herein. The system 500 may be configured to operate according to the same processes as described in FIGS. 7, 8, and 9. Circuitry for the system 500 may be configured in a layered manner similar to the construction shown in FIG. 1 except that the receptacle card 32 may be substantially reduced in size or eliminated. In the latter case the receptacles 514, 516 may be directly coupled to the processor circuit 16 that is positioned just beneath the display assembly 14. The processor circuit and display assembly in the embodiment of FIG. 11 are not shown in FIG. 11 because they would be substantially identical to the corresponding embodiments pictured in FIG. 1.

To summarize, described herein above is an active, stand alone memory device storage unit, comprising a housing, a plurality of memory device receptacles installed in a first surface of the housing, a touch sensitive display screen installed in an outer surface of the housing in an adjoining relationship with the first surface. The unit provides portable storage for a plurality of compact memory devices and is operative to display a sequence of graphic displays including in order a menu map of the memory device receptacles, a directory of each memory device occupying each selected memory device receptacle in the unit, and at least one content page of a selected directory item. The unit includes a processor circuit coupled to the plurality of receptacles and to the touch sensitive display screen and enclosed within the housing. The processor circuit further comprises a first circuit for controlling the touch sensitive display in response to a user selection entered upon the touch sensitive display and a program responsive to the user selection to control display of information from at least one memory device installed in one of the memory device receptacles, the information including a memory device identifier and a receptacle indicator associated with the memory device, and at least a directory of the contents of the one memory device.

There is also described herein a method for storing and displaying contents of a plurality of compact memory devices in an active stand alone memory device storage unit without requiring connection to a computing device. The method begins with the step of installing the memory devices in the active stand alone memory device storage unit that has a plurality of receptacles for the memory devices and a touch sensitive display screen coupled to the plurality of receptacles. The method further includes the steps of displaying in a main menu on the display screen a memory device icon associated with each installed memory device, touching a memory device icon on the display associated with an installed memory device to request display of the contents of said memory device, displaying a directory of the contents of said memory device on said display, touching the display screen at a listing of the directory to select an item corresponding to the listing for display on the display screen, and displaying the selected item corresponding to the listing.

Scenarios in the use of the system described herein include but are not limited to the following. For example, if a user wishes to give or transfer information to another person the information can be selected and transferred to a flash drive provided by the recipient. Also, the invention allows a user to leave his or her office with, e.g., several flash drives of information or data and have convenient access to them while away from the office, for use in meetings, presentations, and the like. Further, while traveling, the storage device can be locked or, in some embodiments, secured from damages due to heat, fire, water, etc. Moreover, the system bars access to the memory devices stored in the storage container by anyone except the user.

In use, other examples of use include the ability to access the table of contents of a flash drive to obtain more complete information than could be written on a label small enough to be attached to the flash drive, which is a very small device. Thus, the contents can be accessed and read independently of any other device such as a laptop or other computer. Further, the system of the present invention can be used as flash drive hub when plugged into a computer and connected via the communications interface. And, as described herein, the system can copy the entire flash drive contents or selected individual files from one flash drive to another or to an external device or printer. Another advantage is that the flash drives are securely stored in the respective receptacles instead of being loosely accumulated in a box or bag, or pocket or purse.

While the invention has been shown in only one of its forms, it is not thus limited but is susceptible to various changes and modifications thereof without departing from the spirit, concepts, and principles of the invention as set forth in the appended claims. One such modification, for example, is to include in the communications interface 88 (See FIG. 2) an RF or optical receiver or, alternatively, an RF or optical transceiver, so that storage boxes could communicate, that is, transfer files from a memory device in one system 10 to another similarly equipped system 10.

What is claimed is:

1. An active, stand alone storage unit for compact memory devices, comprising:
   a housing;
   a plurality of memory device receptacles installed in a first surface of said housing;
   a touch sensitive display installed in an outer surface of said housing adjoining said first surface wherein said stand alone storage unit is operative without requiring connection to a computing device to display a sequence of graphic displays including in order a menu map of said memory device receptacles, a directory of a compact memory device occupying a selected memory device receptacle, and at least one content page of a selected directory item; and
   a processor circuit coupled to said plurality of receptacles and to said touch sensitive display and enclosed within said housing, said processor circuit further comprising:
   a first circuit for controlling said touch sensitive display in response to a user selection entered upon said touch sensitive display; and
   a program responsive to said user selection, to control display of information from at least one said memory device installed in one of said memory device receptacles, said information including a memory device identifier and a receptacle indicator associated with said memory device, and at least a directory of the contents of said memory device.

2. The storage unit of claim 1, said menu map comprising:
   a main menu of graphic images corresponding to the operative status of each said memory device receptacle and of each said memory device occupying a memory device receptacle; and
   an array of user touch-selection images corresponding to user-entered commands for controlling said storage device.

3. The storage unit of claim 2, said graphic images comprising:
   displayed data corresponding to each said memory device receptacle selected from the group consisting of a symbol representing a said memory device receptacle, a title of a memory device occupying a said memory device receptacle, a bar graph of memory capacity, an indicator of memory occupied in said memory device, and an indicator of memory unoccupied in said memory device.

4. The storage unit of claim 1, said directory comprising:
   a graphic display including a document identifying icon, a title of said document, a date of entry into said memory device, and a size of said document stated in numeric units.

5. The storage unit of claim 1, wherein said compact memory device comprises:
   a memory device having small size and a communication interface and connector.

6. The storage unit of claim 5, said memory device comprising:
   a non-volatile semiconductor memory, and a USB interface and connector.

7. The storage unit of claim 2, said touch-selection images comprising:
   at least one button image selected from the group consisting of copy, paste, print, main menu, and back.

8. The device of claim 1, said processor circuit further comprising:
   a communication interface circuit including an output port for communicating contents of a selected memory device to an external peripheral or computing device.

9. The storage unit of claim 8, said communication interface circuit comprising:
   a wireless transmitter coupled to an output port; and
   a driver circuit for coupling an output signal of said transmitter to an antenna or a transmission line.

10. The storage unit of claim 9, wherein said wireless transmitter is a circuit selected from the group consisting of an RF transmitter and an optical transmitter.

11. The storage unit of claim 1, said memory device receptacles comprise:
- receptacles for memory devices compatible with the Universal Serial Bus (USB) standard.

12. The storage unit of claim 8, wherein said output port comprises a USB receptacle.

13. The storage unit of claim 1, further comprising:
- a power supply including a power switch contained within said housing and connected to said processor and to said display.

14. The device of claim 1, further comprising:
- a housing formed of a first unit hinged to a second unit, wherein one of said first and second units contains said plurality of said receptacles and the other of said first and second units contains said display;
- said processor circuit is disposed within one of said first and second units; and
- a cable connecting said plurality of receptacles to said processor circuit and said touch sensitive display to said processor circuit.

15. The storage unit of claim 1, wherein said housing further comprises:
- fire-resistant construction suited to safe storage of said memory devices.

16. The storage unit of claim 1, wherein said housing further comprises:
- water-resistant construction suited to safe storage of said memory devices.

17. The storage unit of claim 1, wherein said housing further comprises:
- a pocket-sized case including first and second memory device receptacles.

18. A method for storing and displaying contents of a plurality of compact memory devices without requiring connection to a computing device, comprising the steps of:
- installing said memory devices in an active stand alone memory device storage unit having a plurality of receptacles for said memory devices and a touch sensitive display screen coupled to said plurality of receptacles;
- displaying in a main menu on said display screen a memory device icon associated with each installed said memory device;
- touching a memory device icon on said display associated with an installed said memory device to request display of the contents of said memory device;
- displaying a directory of said contents of said memory device on said display;
- touching said display screen at a listing of said directory to select an item corresponding to said listing for display on said display screen; and
- displaying said selected item corresponding to said listing.

19. The method of claim 18, further comprising the steps of:
- displaying a set of command icon buttons in said main menu operable to initiate processing for copy, paste, print, main menu, and back functions; and
- touching one of said command icon buttons on said display to initiate processing of the contents of said selected item of said memory device.

20. The method of claim 19, wherein said step of touching comprises the step of:
- touching in sequence said copy and paste command icon buttons to transfer a selected content item to be transferred to a destination memory device in said storage unit.

21. The method of claim 19, wherein said step of touching further comprises the steps of:
- selecting a destination memory device icon to receive said selected content item; and
- touching said paste button to transfer said selected content to said destination memory device.

22. The method of claim 19, wherein said step of touching comprises the step of:
- touching in sequence said copy and paste command icon buttons to transfer a selected content item to be transferred via a communications interface in said storage unit to a destination memory device external from said storage unit.

23. The method of claim 19, wherein said step of touching comprises the step of:
- touching a print command icon button to transfer a selected content item to be transferred via a communications interface in said storage unit to a destination printer external from said storage unit.

* * * * *